United States Patent [19]

le Grand et al.

[11] Patent Number: 5,071,970

[45] Date of Patent: Dec. 10, 1991

[54] PROCESS FOR PRODUCING PECTIN WITH A HIGH-TO-MEDIUM METHOXYL CONTENT FROM BEET PULP

[75] Inventors: Ferdinand le Grand; Stevens, Ned C., both of Gainesville, Fla.

[73] Assignee: University of Florida, Gainesville, Fla.

[21] Appl. No.: 478,492

[22] Filed: Feb. 12, 1990

Related U.S. Application Data

[63] Continuation-in-part of Ser. No. 275,745, Nov. 23, 1988, abandoned.

[51] Int. Cl.$^5$ .......................... C08B 37/06; C07H 1/06
[52] U.S. Cl. .......................................... 536/2; 536/128
[58] Field of Search .................................... 536/2, 128

[56] References Cited

U.S. PATENT DOCUMENTS

| | | | |
|---|---|---|---|
| 2,550,705 | 5/1951 | Maclay et al. | 536/2 |
| 2,577,232 | 12/1951 | Cole | 536/2 |
| 2,626,706 | 1/1953 | Bishop | 536/2 |
| 2,647,890 | 8/1953 | Bishop | 536/2 |
| 2,703,758 | 8/1955 | Leo et al. | 536/2 |
| 2,801,178 | 7/1957 | Leo et al. | 426/50 |

*Primary Examiner*—Nathan M. Nutter
*Attorney, Agent, or Firm*—Arthur G. Yeager

[57] ABSTRACT

Beet pulp is reduced to small particle size and hydrolyzed in HCl at a low temperature for a long time and then peptized in hot water at 60°-70° C. for about one hour to produce an aqueous pulp slurry that is screened to recover the liquid which is filtered and mixed with aluminum chloride to lower the pH about 0.1 pH unit to the range of 1.8-2.25 pH. Ammonium hydroxide is then added to raise the pH to about 4.0-4.5 to form an aluminum pectinate precipitate, which is washed with an acidified alcoholic liquid to produce high-to-medium methoxyl pectin which is separated and dried to a stable powder. Waste streams are converted to animal feed or are recovered and recycled.

15 Claims, 1 Drawing Sheet

PROCESS FOR PRODUCING PECTIN WITH A HIGH-TO-MEDIUM METHOXYL CONTENT FROM BEET PULP

RELATED APPLICATIONS

This application is a continuation-in-part of applicant's copending patent application, Ser. No. 07/275,745 filed Nov. 23, 1988 and now abandoned.

BACKGROUND OF THE INVENTION

Pectin, a food product used in the manufacture of jams, jellies, and other products that require gel-forming properties, has normally been made from apple pomace or citrus fruit peel. A desire to find other sources of pectin has led to research to find a method of producing pectin from sugar beets, a world-wide product that has not been successfully used as a valuable source of other food products, except for animal feed.

In Journal of American Chemistry and Science, Vol. 72 pp. 813-816 (February 1950) there is an article by Pippen et al. which points out that pectin from sugar beets has not exhibited the necessary jelling power to make it commercially attractive, and mentions various theories which have been proposed to explain this lack of jelling power. Among these theories are:

1. The presence on the pectin molecule of acetyl groups not found to the same extent on apple or citrus pectin;
2. The low molecular weight of the beet pectin molecule as compared to the higher molecular weight of the apple and citrus pectin; and
3. The presence of too many nonuronide groups on the beet pectin molecule as compared to the apple and citrus pectin. Pippen et al. concluded that beet pectin had an acceptable jelling power if the acetyl content of the pectin molecule was not greater than about 1% by weight.

Generally, beet pectin has about 3-4% acetyl and 12-14% methoxyl content which is too high in acetyl content to provide good jelling power. The difficulty of preparing an acceptable beet pectin is that when acetyl groups are removed from the beet pectin molecule, methoxyl groups are also removed.

High methoxyl content, i.e., about 8-13% is necessary in order to provide jelling power for fruit juices and other acidic substances. Medium methoxyl content, i.e., 5-8% is needed for pectin to be used in nonacidic media, e.g., milk, to prepare puddings and the like. Low methoxyl content, i.e., 0-5% is not useful in jelling procedures. The largest use is in jelling fruit juices, and therefore, the most desirable pectin is one with high methoxyl content and low acetyl content. Acetyl content must be below about 1% in order not to interfere with the jelling power. The prior art has not known how to make such a pectin from beet pulp. The art of making pectin from citrus or apple peel is represented by:

Maclay et al. U.S. Pat. No. 2,550,705;
Cole U.S. Pat No. 2,577,232;
Leo et al. U.S. Pat. No. 2,703,758;
Leo et al. U.S. Pat. No. 2,801,178; and
Wiles U.S. Pat. No. 3,622,559.

The art relating to processes for making pectin from beets is found in:
Bishop U.S. Pat. No. 2,626,706; and
Bishop U.S. Pat. No. 2,647,890.

Insofar as is known, the prior art has not known how to make a pectin from beet pulp which has a good jelling power and has a high-to-medium methoxyl content.

It is an object of this invention to provide an improved process for preparing acceptable pectin from beets. It is another object of this invention to provide a process for preparing beet pectin of low acetyl content and a high-to-medium methoxyl content. Still other objects will become apparent from the more detailed description which follows.

BRIEF SUMMARY OF THE INVENTION

This invention relates to a process for producing pectin from beet pulp which comprises:

(a) mixing dry granular beet pulp with an aqueous solution of a strong, mineral acid, preferably hydrogen chloride, at about 45° C. for about two days to produce a dry, free-flowing pulp mass having an acetyl content of not more than about 1%, by weight;

(b) mixing one part of the pulp mass with about 10-20 parts of hot water, with rigorous agitation for about one hour at 60°-70° C.;

(c) separating the resulting mixture into waste solids and a liquid containing pectin values;

(d) stirring and cooling the liquid from step (c) to about 20°-25° C., adding aluminum chloride to obtain a pH drop of about 0.1 in a pH range of 1.8-2.25 and subsequently adding ammonium hydroxide until the pH is raised to about 4.0-4.5, while allowing solids to precipitate as an aluminum pectinate in a liquid medium;

(e) separating the aluminum pectinate solids from the liquid medium to produce a first liquid waste stream;

(f) mixing one part of the separated wet, aluminum pectinate solids with 2.5-3.0 parts of 95% alcohol acidified with HCl to a pH of about 2.0 and blending at high speed into a homogenized mixture of precipitated pectin in the liquid alcohol medium;

(g) separating the pectin precipitated solids from the liquid alcohol medium, and recovering dry storable pectin powder; and (h) subjecting the liquid alcohol medium to distillation and recovery steps to recover the alcohol and the aluminum chloride for reuse.

In specific embodiments of this invention (1) the aqueous solution of hydrogen chloride in step (a) contains about 5% by volume hydrogen chloride, and the amount of said solution is about 2.5 parts by weight per 1.0 part by weight of said beet pulp; (2) step (c) includes the addition of a particulate filtering aid such as bentonite or decalite, prior to filtering; (3) the alcohol in step (f) is ethanol or isopropanol; (4) the dry granular beet pulp employed as a feed to step (a) has a particle size of about 1 mm; (5) the waste solids from step (c) are mixed with calcium oxide to raise the pH to about 6.0 and dried for use as an animal feed; and (6) the hot water of step (b) is at a temperature of about 60°-70° C.

This invention also relates to a system for producing high-to-medium methoxyl, low acetyl pectin from sugar beet pulp which comprises:

(a) milling dry sugar beet pulp to a particle size of about 2 mm;

(b) mixing the milled pulp with about 5% by volume aqueous HCl at 45° C. and leaving the mixture for about 48 hours at a solid-to-liquid weight ratio of about 1.0 to 2.5 to hydrolyze the pulp and remove acetyl groups;

(c) vigorously stirring said pulp solids with hot water at a temperature of about 60°–70° C. for about one hour;

(d) passing the resulting mixture over a screen to remove the liquid from waste solids;

(e) mixing the liquid from the screen with bentonite or decalite and filtering the resulting mixture to remove substantially all solids and recover a polished, clear liquor containing dissolved pectin values;

(f) cooling the liquor in a heat exchanger to about 20°–25° C.;

(g) adding aluminum chloride to cause a pH drop of about 0.1 unit in a pH range of 1.8–2.25;

(h) adding ammonium hydroxide to raise the pH to about 4.0–4.5;

(i) allowing a precipitate of aluminum pectinate to form, separating the solids from the liquor in a helical conveyor centrifuge, and washing twice with cold water;

(j) vigorously blending the centrifuged solids and sufficient acidified 95% alcohol at a pH of about 2.0 to produce a mixture of pectin containing solids and a liquid alcoholic medium of about 60% alcohol, and centrifuging to separate pectin solids from the alcoholic medium;

(k) distilling the resultant alcoholic medium to recover 95% alcohol and an acidic aluminum-containing liquid;

(l) subjecting the pectin-containing solids to washing and drying to produce dry pectin powder;

(m) treating the aluminum-containing liquid with potassium hydroxide to raise the pH to about 4 to recover precipitated aluminum hydroxide by filtering, and adding hydrochloric acid to the precipitate to a pH of about 2.0–2.5 to solubilize aluminum chloride which then can be recovered as a liquid or a solid for recycling into step (g).

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

DETAILED DESCRIPTION OF THE INVENTION

Figure 1:
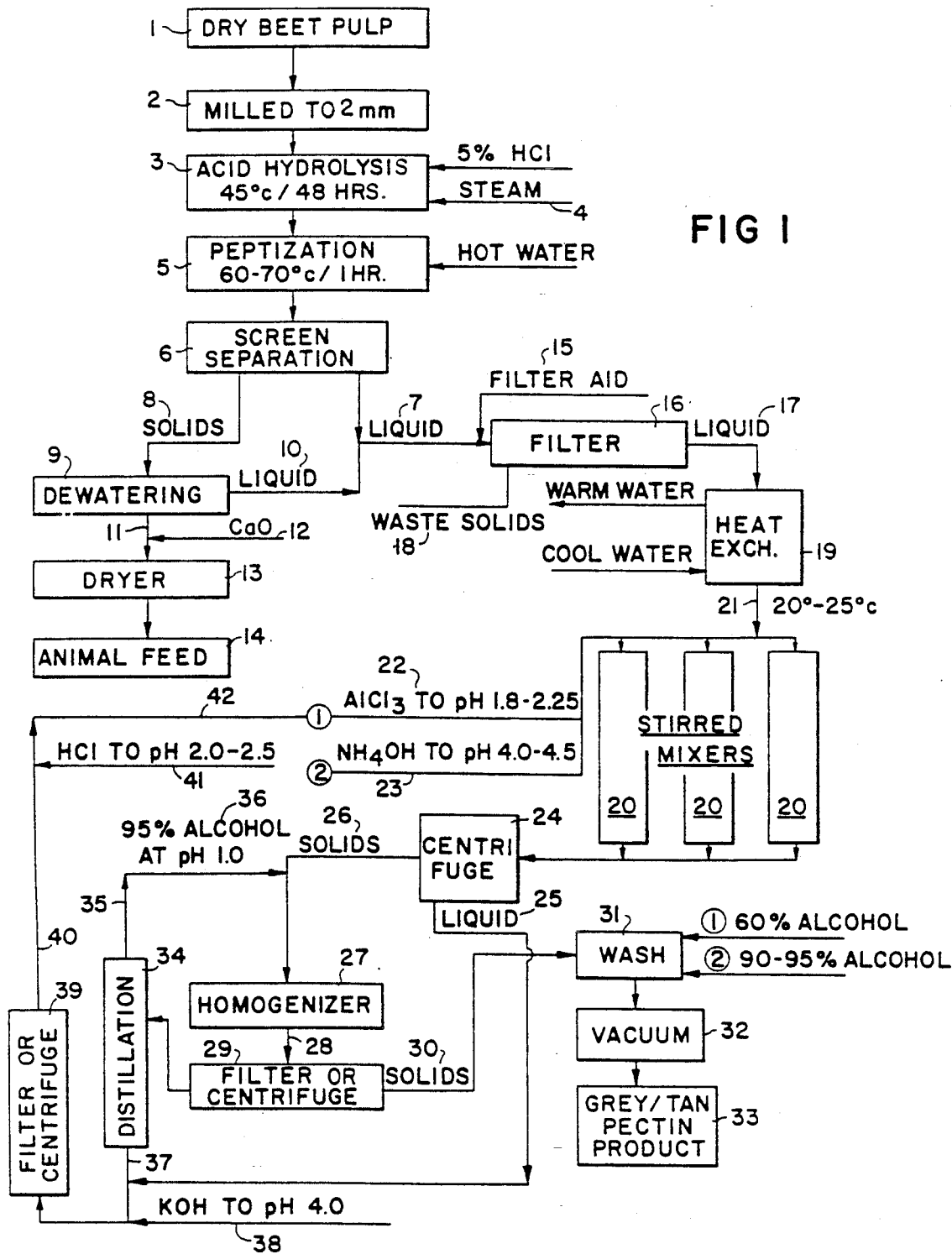
FIG. 1 is a schematic flow sheet of the process and system of this invention.

The process and system of this invention are best understood by reference to the flow sheet in FIG. 1 of the drawings. Numbers in text refer to identical numbers in the drawing.

Dry beet pulp 1 is preferably reduced 2 in a hammermill, attrition mill, or similar device having a screen opening of about 10 mesh (opening of about 2 mm). This preparation of dry pulp will assure uniformity of product at all times, and should, therefore, enhance recovery rate of pectin from pulp. Experimentation has indicated a pectin yield of 18% for non-reduced beet pulp and a yield of 22.6% for beet pulp reduced to about 1 mm.

The milled dry pulp 2 is subjected for about 48 hours to acid hydrolysis 3 by mixing with a heated solution of diluted HCl.(5% v/v diluted commercial HCl) i.e., about 38% acid by weight having 12.4 molarity; specific gravity of 1.19 or 23° Baume at about 20° C.) The solution is mixed with the dry pulp at a weight ratio of 2.5/1.0 (w/w). Temperature of the employed liquid should be such that the mixture of liquid and dry pulp registers about 45° C. The formed mixture at 45° C. is free-flowing as the dried pulp mass easily absorbs the added acidified liquid.

The obtained mass of acidified somewhat moist pulp is hydrolyzed at low temperature during a long period, i.e., about two days. The general prior art has stated that pectin from sugar beet possibly fails to form a satisfactory gel because of its high acetyl content on the uronic anhydride molecule, and because of the rather small size of the beet pectin molecule (low molecular weight).

To adequately remove the detrimental acetyl content while still retaining the beneficial methoxyl content of pectin and also preventing cleaving of the already small pectin molecule, a low temperature/long period has been adopted as the preferred hydrolyzing system for the acidified pulp mass. Hydrolyzing at 45° C. for 48 hours produces a pectin from beet pulp with a satisfactory gelling capability. Analysis of the pectin has shown $<1.0\%$ of acetyl is still present for the pectin after having been subjected to the stated hydrolyzing period with acid at the stated temperature. Hence, this process slowly hydrolyzes the acidified pulp mass for about 48 hours at 45° C. The low percentage of acetyl ($<1.0\%$ after the hydrolyzing period) is believed to be important for the proper gelling of the beet pectin. It may be quite possible that the original acetyl content in dry sugar beet pulp varies due to prevailing climate from year to year and by sugarbeet variety processed within the same crop year. Hence, the dry beet pulp may be analyzed for acetyl content at regular intervals, so as to adjust the time for hydrolysis slightly from the stated 48 hours as to obtain a final pectin of as close to $<1.0\%$ acetyl content as possible. Such adjustments in time for hydrolysis would promote constant uniformity of final pectin product. Changing the acid concentration and quantity for mixing with dry beet pulp, or changing the prevailing hydrolyzing temperature away from 45° C. are not recommended. These changes may lower significantly the beneficial methoxyl content of pectin and may promote the destruction of the already small molecule for beet pectin (a reduction in molecular weight). Hence, the only variable factor should be time lapse for hydrolyzing with acid.

The equipment recommended for acid hydrolysis 3 is one or more large insulated boxes. Each box should be double walled, and closed with a cover. The front side is hinged in order to empty the box after the time lapse permitted to hydrolyze (about 48 hours). The other side can be hydraulically lifted to facilitate easy emptying. Low pressure steam 4 or warm water may be circulated between the double walls to retain temperature at 45° C. during the 48 hours needed for hydrolyzing.

The pectin thus hydrolyzed at 3 is solubilized within the pulp particles and is recovered in a "peptizing" operation 5. The hydrolyzed pectin mass from 3 is mixed with about 10–20, preferably about 15, parts of hot water, and is vigorously stirred at about 60°–70° C. for about one hour. Lower temperatures or longer times in the peptization step 5 may result in lower pectin yields.

Peptizing may take place continuously in a large U-shaped tank fitted with a screw to provide constant motion to the solids, and fitted with steam nozzles to maintain a constant temperature of about 60°-70° C. A parallel current installation is recommended for admitting pulp feed and water simultaneously to the vigorously stirred tank. Retrieval of this mass after one hour (at pH about 2.0-2.5) from the tank, should be accomplished.

The peptized pulp/liquid mass from peptization step 5 is transferred to a screen 6 for liquid/pulp separation. Preferably the separation is accomplished on a DSM screen or a vibrating screen. The liquid 7 from screen 6 is processed further.

The pulp solids 8 from the screen 6 are dewatered in a screw press 9 with the liquid 10 from the screw press 9 added to the liquid 7 recovered from the screen 6 for further processing. The dewatered pulp from screw press 9 is mixed with some calcium oxide 12 for raising the pH to about 6.0 and this material is dried 13 for use as animal feed 14.

The value of this dried material as feed for ruminants is limited to its residual cellulose and hemicellulose content, as roughage only, since soluble sugars including pectin have been removed from this pulp during the peptizing step 5.

The liquids 7 and 10 recovered from the DSM screen 6 and from the dewatering press 9, at a pH of about 2.0-2.5, are somewhat viscous and contain a fair amount of suspended fine fibers. These liquids are still hot, at about 60°-70° C., and filter easily. A filtering aid, preferably decalite or bentonite, 15, is added to the liquid stream at the rate of ½-1% on dry pulp weight in a mixer and the liquid is filtered 16 to a polished, clear liquor 17. The filtered solid impurities 18 are discarded.

Next, the clear filtrate 17 is cooled in a heat exchanger 19 to about 20°-25° C. This temperature is not critical. A somewhat lower temperature may be advantageous while a higher temperature may be disadvantageous.

Up to this point the process is preferably carried out continuously. The next step in mixer 20 is the precipitation of pectin from the clean, peptized solution and should preferably be carried out in a batch system. Therefore, three vessels 20 are shown in the drawing, each with a stirring device. One vessel 20 is filling, the next vessel 20 is reacting while the last vessel 20 is emptying. The sequence may be automated allowing for predetermined quantities of products and chemicals to be carried in each vessel.

First, a predetermined quantity of cooled, peptized pectin containing liquid 21 is admitted. Aluminum chloride 22 is then admitted to lower the pH about one-tenth (0.1) point (i.e., from an entrance pH of about 2.0-2.5 to a pH of about 18-2.25). Ammonium hydroxide 23 is then added to raise the final pH to 4.0-4.5. In practice the exact quantity to produce the desired pH can be predetermined in the laboratory. The pectin will suddenly precipitate from the peptized solution within a very narrow pH range. The entire cycle in mixers 20 may take a total of 15 minutes. This process employs less aluminum chloride and incurs less color formation than previous procedures wherein the order of addition of aluminum chloride and ammonium hydroxide is reversed.

When a weak base is added to a pectinic solution, followed by the addition of a metallic salt, the hydroxyl ion will split the metallic salt to cause the metallic ion to attach to the pectin, and neutralizing its charge in the solution. The result is the precipitation of the pectin. In this procedure, pectin forms an organic salt, an ester, aluminum pectinate, which is insoluble in water and precipitates from the peptized solution. In the present process this procedure is reversed by first adding the metallic salt, preferably aluminum chloride, to acidify very slightly the solution, and secondly, adding the weak base, preferably ammonium hydroxide, to neutralize the charge in solution to cause precipitation of aluminum pectinate. This reversed addition is greatly preferred because it utilizes much less aluminum chloride and much less ammonium hydroxide to accomplish the same result.

Any further addition of $AlCl_3$ to the peptizing solution after reaching about pH 3.8 will not contribute to pectin precipitation. This phenomenon was confirmed when the introduction of residual filtrate (after removal of all precipitated aluminum pectinate) to an alcoholic solution produced no further precipitation, indicating that addition of $AlCl_3$ had removed all available pectin. Metallic salts other than $AlCl_3$ were tried for precipitation with $NH_4OH$, e.g., NaCl and $CaCl_2$, but they did not work satisfactorily for precipitation of pectin from sugar beet pulp.

Pectin has in the past generally been precipitated by adding pectin containing solutions to ethanol, isopropanol, methanol or acetone. This method for precipitation of sugar beet pectin in the peptized solution has only been moderately successful, due to the fairly large content of lipids and protein inherent in sugar beet pulp. These lipids and proteins may also be precipitated in the presence of alcohols or acetone, causing sliminess of the recovered pectin and difficulty with subsequent drying of the recovered pectin.

Lipids and proteins in sugar beet pulp in the clarified peptized solution, may also be removed by the use of enzymes. Adequate action by these enzymes is not totally predictable due to differing quantities of lipids and protein content sometimes encountered in sugar beet pulp. Therefore, the desired effect from enzymes is difficult to control with any accuracy.

For these reasons the preferred method of precipitating pectin is by aluminum chloride in the presence of ammonium hydroxide. The reaction is fast and very easily controlled. The method completely precipitates pectin only, while solubilized proteins and lipids remain in solution. Therefore, precipitation with $AlCl_3$ is the preferred method for pectin recovery from sugar beet pulp. Maintaining the reaction medium in mixers 20 at 25° C. is needed to avoid possible demethoxylation of the pectin in solution. The aluminum pectinate thus precipitated is now insoluble in water. Later this pectin must be made soluble in water again, in order that the product will be suitable for gel formation.

The precipitated aluminum pectin ester 26 is removed by use of a helical conveyor centrifuge 24. The liquid waste stream 25 containing some aluminum chloride is removed and treated as described below to recover the aluminum chloride.

The pectin solids 26 (aluminum pectinate, insoluble in water) are admitted to a vigorously agitated tank 27 such as a homogenizer. Acidified 95% alcohol (pH about 2.0) 36 is added in a ratio of about 2.5-3.0 parts acidified alcohol per part of pectin solids so that the final resulting liquid contains less than about 4% by weight pectin. The alcohol content of the stirred mass must not fall below about 55–60%; otherwise the acid will solublize the pectin causing losses in the yield of pectin. A relatively low quantity of alcohol can be used in this procedure. The pectin is thoroughly washed with acidified alcohol to remove the aluminum from the aluminum pectinate to form aluminum chloride which is soluble in alcohol. Meanwhile the remaining pectin, now freed from its aluminum, is water-soluble. The reaction is fast, requiring only a few minutes of time. The alcohol preferably is ethanol, although methanol or isopropanol can be used. The acid preferably is hydrochloric acid diluted to about 5% by weight acid.

The mixture 28 of pectin solids, now in about 60% acidified alcohol, is filtered or centrifuged 29 to remove the pectin solids 30 from the liquid alcoholic phase. The solids 30 are washed 31 in the centrifuge with 60% alcohol to remove excess acid and then with 90–95% alcohol to make it easier to dry the solids in a vacuum drier 32 from which is recovered the product 33, a greyish-tan pectin.

The liquid from filter or centrifuge 29 is fed to a distillation tower 34 to recover alcohol overhead 35 which is recycled to 36 for reuse. The bottoms 37 from distillation tower 34 contain aluminum chloride and is combined with the liquid 25 from centrifuge 24 since both are similar in pH (approx. 2.5). Potassium hydroxide is added 38 to raise the pH to about 4.0 causing the aluminum to precipitate as Al(OH)$_3$ in the form of a white gel-like substance. The aluminum hydroxide is removed by filtering or centrifuging 39. The precipitated solids 40 are resolubilized by the addition of hydrochloric acid 41 to form a concentrated solution of aluminum chloride 42 at a pH of about 2.0–2.5 which is recycled to the process stream 22. This procedure recovers most of the aluminum chloride used in process stream 22.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A process for producing pectin from beet pulp which comprises:
    (a) mixing dry granular beet pulp with an aqueous solution of a strong mineral acid at about 45° C. for about two days to produce a dry free-flowing pulp mass having an acetyl content of not more than about 1%, by weight;
    (b) mixing one part of the pulp mass with about 10–20 parts of water with vigorous stirring for about one hour at 60°–70° C.;
    (c) separating the resulting mixture into waste solids and a liquid containing pectin values;
    (d) stirring and cooling the liquid from step (c) to about 20°–25° C., adding aluminum chloride to obtain a pH drop of about 0.1 point in a pH range of about 1.8–2.25, and subsequently adding ammonium hydroxide until the pH is raised to about 4.0–4.5, while allowing solids to precipitate as an aluminum pectinate in a liquid medium;
    (e) separating the aluminum pectinate solids from the liquid medium to produce a first liquid waste stream;
    (f) mixing one part of the separated, wet, aluminum pectinate solids with 2.5–3.0 parts of 95% alcohol, acidified with HCl to a pH of about 2.0, and blending at high speed into a homogenized mixture of precipitated pectin in a liquid alcohol medium;
    (g) separating the pectin precipitated solids from the liquid alcohol medium, and recovering dry storable pectin powder, and
    (h) subjecting the liquid alcohol medium to distillation and recovery steps to recover the alcohol and the aluminum chloride for reuse.

2. The process of claim 1 which additionally comprises a step of recovering the solids from step (c) and treating them for use as an animal feed.

3. The process of claim 1 wherein said aqueous solution of a strong, mineral acid in step (a) contains about 5% v/v diluted hydrogen chloride and the amount of said solution is about 2.5 parts by weight per 1.0 part by weight of said beet pulp.

4. The process of claim 1 wherein step (c) includes the addition of a particulate filtering aid prior to filtering.

5. The process of claim 4 wherein said filtering aid is bentonite or decalite.

6. The process of claim 1 wherein said acidified 95% alcohol of step (f) is 95% alcohol acidified with an aqueous solution containing about 5% by weight hydrogen chloride to a pH of about 2.0.

7. The process of claim 6 wherein said alcohol in step (f) is ethanol or isopropanol.

8. The process of claim 1 wherein the dry granular beet pulp employed as a feed to step (a) has a particle size of about 2 mm.

9. The process of claim 2 wherein the solids from step (c) are mixed with calcium oxide to raise the pH to about 6.0 and dried for use as an animal feed.

10. The process of claim 1 wherein step (g) is accomplished by washing the precipitated solids with acidified alcohol to remove aluminum from the aluminum pectinate solids as aluminum chloride and to convert the solids to water-soluble pectin.

11. A process for producing a high-to-medium methoxyl, low acetyl pectin from sugar beet pulp which comprises the sequential steps of:
    (a) reducing dry sugar beet pulp to a dry particulate feed material having a particle size of about 2 mm;
    (b) mixing about 2.5 parts by weight of aqueous hydrogen chloride solution containing about 5% v/v diluted hydrogen chloride with 1.0 part by weight of said dry particulate feed material at a temperature of about 45° C. for a time of about 48 hours to produce an acid-hydrolyzed pulp material containing pectin with less than about 1% by weight of acetyl.
    (c) mixing about one part by weight of said acid-hydrolyzed pulp with about 10–20 parts by weight of water, and vigorously stirring the mixture for about one hour at 60°–70° C. to produce a mass of peptized pulp in an aqueous liquid;
    (d) dewatering the product mass from step (c) and separating the solids from an aqueous pectinic liquid containing pulp fibers;
    (e) adding to said aqueous pectinic liquid, bentonite or decalite in a liquid medium at a rate of 0.5–1.0% by weight of dry pulp fibers, mixing the resulting liquid mass and filtering to produce a polished, clear liquor containing dissolved pectin values;

(f) cooling said clear liquor to about 20°-25° C.;

(g) adding aluminum chloride to the clear liquor while stirring until the pH is lowered about 0.1 point to 1.8-2.25;

(h) adding ammonium hydroxide to the resulting mixture while stirring to raise the pH to about 4.0-4.5;

(i) stopping the stirring and allowing a precipitate of aluminum pectinate to form in the aqueous liquor;

(j) centrifuging the aqueous liquor and the precipitated solids to separate the aluminum pectinate solids from the liquid, identified as the first waste stream;

(k) adding to said aluminum pectinate solids 95% alcohol acidified with hydrogen chloride to a pH of about 1.0 and vigorously stirring the mixture of solids and acidified alcohol containing less than about 4% by weight of pectin;

(l) separating the pectin solids from the alcohol medium and drying the pectin solids to a stable, storable powder;

(m) distilling said alcohol medium from step (l) to recover 95% alcohol as an overhead product for use in step (k) and an aqueous medium as a bottoms product; and (n) adding a metal hydroxide to said bottoms product to raise the pH to about 4.0 to precipitate aluminum hydroxide, filtering to separate aluminum hydroxide, adding hydrogen chloride to a pH of 2.0-2.5 and recovering aluminum chloride for use in step (g).

12. The process of claim 11 wherein said first waste stream from step (j) is added to said bottoms product in step (n).

13. The process of claim 11 wherein said metal hydroxide in step (n) is potassium hydroxide.

14. The process of claim 11 wherein said pectin solids in step (l) are washed with 60% alcohol followed by washing with 90-95% alcohol, and then dried to said stable, storable powder.

15. A system for producing high-to-medium methoxyl, low acetyl pectin from sugar beet pulp which comprises:

(a) milling dry sugar beet pulp to a particle size of about 2 mm;

(b) mixing the milled pulp with 5% v/v diluted aqueous HCl at 45° C. for about 48 hours at a solid to liquid weight ratio of 1.0:2.5 to produce hydrolyzed pulp solids;

(c) agitating said pulp solids with steam to produce a mixture of about one part solids to 10-20 parts water at a temperature of about 60°-70° C. for about one hour;

(d) passing the resulting mixture over a screen to remove the liquid from waste solids;

(e) mixing the liquid from the screen with bentonite or decalite and filtering the resulting mixture to remove substantially all solids and recover a polished, clear liquor containing dissolved pectin values;

(f) adding calcium oxide to the solids from the screen to raise the pH to about 6.0, and drying to produce a ruminant animal feed supplement as a by-product;

(g) cooling said polished clear liquor in a heat exchanger to about 20°-25° C.;

(h) adding $AlCl_3$ to the cooled liquor until the pH is lowered about 0.1 point in pH value to a range of 1.8-2.25;

(i) adding ammonium hydroxide to the liquor to raise its pH to about 4.0-4.5 while stirring;

(j) allowing a precipitate of aluminum pectinate to form in the absence of stirring and separating the solids from the liquor in a helical conveyor centrifuge;

(k) homogenizing the centrifuged solids and sufficient 95% alcohol acidified with HCl to a pH of about 1.0 in a solids/liquid mixture having less than 4% solids and an alcohol content of at least 55%;

(l) separating the pectin precipitate from the alcoholic solution in a helical conveyor centrifuge and washing the precipitate with alcohol and drying the washed solids to a dry storable pectin powder;

(m) distilling the alcoholic solution from said centrifuge to recover 95% alcohol as an overhead product and a liquid bottoms product containing aluminum values;

(n) adding said liquor from step (j) to said bottoms product and adding to the resulting liquid sufficient KOH to raise the pH to about 4.0 to produce a precipitate of aluminum hydroxide; and (o) separating the aluminum hydroxide solids from the liquid and treating the solids with HCl to about 2.0-2.5 pH and recovering aluminum chloride therefrom.

* * * * *